(12) United States Patent
Klieber

(10) Patent No.: US 7,909,348 B2
(45) Date of Patent: Mar. 22, 2011

(54) ADJUSTABLE-LENGTH SEAT POST

(75) Inventor: Jochen Klieber, Tacherting (DE)

(73) Assignee: Jochen Klieber, Tacherting (DE)

( * ) Notice: Subject to any disclaimer, the term of this patent is extended or adjusted under 35 U.S.C. 154(b) by 0 days.

(21) Appl. No.: 12/707,258

(22) Filed: Feb. 17, 2010

(65) Prior Publication Data

US 2010/0207351 A1    Aug. 19, 2010

Related U.S. Application Data

(60) Provisional application No. 61/153,678, filed on Feb. 19, 2009.

(51) Int. Cl.
*B62J 9/00* (2006.01)

(52) U.S. Cl. ............... 280/288.4; 280/281.1; 297/195.1; 297/215.13

(58) Field of Classification Search ............... 280/281.1, 280/288.4; 248/161, 599; 297/195.1, 344.16, 297/344.12
See application file for complete search history.

(56) References Cited

U.S. PATENT DOCUMENTS

| | | | |
|---|---|---|---|
| 3,596,958 A | 8/1971 | Rowerman | |
| 5,044,592 A | 9/1991 | Cienfuegos | |
| 5,713,555 A | 2/1998 | Zurfluh et al. | |
| 6,050,585 A * | 4/2000 | Rai ............................ | 280/288.4 |
| 6,354,557 B1 | 3/2002 | Walsh | |
| 7,025,522 B2 | 4/2006 | Sicz et al. | |
| 7,712,828 B2 * | 5/2010 | Julliard et al. ........... | 297/215.13 |
| 2004/0070168 A1 | 4/2004 | McKinnon | |
| 2006/0175792 A1 | 8/2006 | Sicz et al. | |

FOREIGN PATENT DOCUMENTS

| | | |
|---|---|---|
| CH | 287064 | 3/1963 |
| DE | 10 2007 001 440 | 7/2008 |
| DE | 10 2007 063 365 | 7/2009 |
| EP | 0 685 383 | 5/1995 |
| EP | 1 618 033 | 1/2006 |
| FR | 997401 | 1/1952 |
| GB | 2116128 | 9/1983 |
| GB | 495 356 | 11/1983 |
| JP | 2000-318666 | 11/2000 |
| WO | WO 2004/094216 | 11/2004 |
| WO | WO 2009/083206 | 7/2009 |

* cited by examiner

*Primary Examiner* — Joanne Silbermann
*Assistant Examiner* — Tashiana Adams
(74) *Attorney, Agent, or Firm* — Eric L. Sophir; Scott T. Weingaertner; King & Spalding LLP

(57) ABSTRACT

An adjustable-length seat post has a stanchion with first and second openings. The seat post has a sliding tube, a locking device and an energy transmission device. The sliding tube is guided through the first opening into the stanchion and is displaceable along a longitudinal direction of extension of the stanchion. The sliding tube is movable relative to the stanchion. An overlap between stanchion and sliding tube in a first position is greater than in a second position. The locking device can be transferred between a locking position and a releasing position, wherein in the locking position the sliding tube is fixed. The energy transmission device can transmit energy from an external actuating element to be provided to the locking device for releasing or locking. When the sliding tube is in the second position, the energy transmission device arranged guided from an external actuating element to be supplied through the second opening of the stanchion as far as the locking device.

16 Claims, 7 Drawing Sheets

ADJUSTABLE-LENGTH SEAT POST

CROSS-REFERENCE TO RELATED APPLICATIONS

This application claims priority to U.S. Provisional Patent Application No. 61/153,678, filed Feb. 19, 2009, entitled, "LONGITUDINALLY ADJUSTABLE SEAT POST," and to German Patent Application No. 10 2009 009 645.0, filed Feb. 19, 2009, entitled, "LONGITUDINALLY ADJUSTABLE SEAT POST," both of which are herein incorporated by reference in their entirety.

FIELD OF THE INVENTION

The present invention relates to an adjustable-length seat post for a bicycle comprising a stanchion along which a sliding tube is displaceable, a bicycle frame with an adjustable-length seat post and a bicycle with a bicycle frame.

BACKGROUND OF THE INVENTION

In present-day mountain bike races ascents and descents, which are mostly of a fairly steep nature, alternate. In order to be able to counterbalance the bicycle specifically during such steep descents, it is necessary for the rider to be able to shift his bottom free from any obstacles behind the saddle in the direction of the rear axle. In the past, for this purpose, in particular when fairly long descents were involved, the rider lowered the seat post in the seat tube of the bicycle and fixed it there. As a result of the freedom obtained between saddle and bottom, it was now possible for the rider to shift his bottom behind the saddle without any problems. However, the lowering of the seat post in the frame could only be made by the rider by making an intermediate stop. This cost valuable time in a race so that these intermediate stops were abandoned, the distance between saddle and bottom bracket was therefore not reduced and it was therefore accepted that on steeper descents, the rider possibly got caught on the rear edge of the saddle. Under adverse conditions, getting caught on the rear edge of the saddle leads to a fall.

SUMMARY OF THE INVENTION

More recently, lowerable seat posts have been produced. These have the advantage that the distance between the bottom and the saddle can be varied in height during the ride. Consequently, during the ride the seat post can therefore be transferred on the one hand into a first retracted position which is ideal for going downhill and, on the other hand, into a second extended position which is optimal for pedaling uphill.

In order to transfer the seat post in a telescopic manner, there is a first possibility in which a release handle is fastened underneath the saddle nose. In order to start to move the seat post, the rider must release one hand from the handlebar, guide this between his thighs to the release handle, actuate the release handle and compress the seat post with his body weight. Synchronising these movement sequences is a major challenge for the coordination capacity of the rider especially as on the one hand he is riding one-handed whilst adjusting the seat post and on the other hand he must concentrate both on the route and also continue to pedal.

A second possibility for length adjustment of the seat post consists in pulling a Bowden cable from the handlebars to the seat post below the saddle. The end of the Bowden cable pointing towards the handlebars is connected to an actuating element fastened to the handlebars. Consequently, the seat post can now be controlled without a hand needing to be taken from the handlebars. The other end of the Bowden cable is firmly connected to the seat post below the saddle. However, it has been found that the end of the Bowden cable which is fastened to the seat post forms a loop specifically in the retracted state of the seat post. With present-day adjusting heights of up to 200 mm, the loop is formed in such a size that riders perceive it to be interfering. The possibility of the rider getting caught on this loop when moving his bottom to counterbalance the bicycle behind or in front of the saddle can no longer be eliminated.

It is accordingly an aspect of the invention to provide an adjustable-length seat post for a bicycle which does not form any loop impeding the rider in the region of the saddle.

This may be achieved by the subject matter of the respective independent claims. Further claims are described in the respective dependent claims.

In one embodiment of the invention, the adjustable-length seat post for a bicycle comprises a stanchion having a first opening and a second opening opposite the first opening. The adjustable-length seat post further comprises a sliding tube, a locking device and an energy transmission device. The sliding tube is guided through the first opening into the stanchion and is displaceable along a longitudinal direction of extension of the stanchion. Furthermore, the sliding tube is movable relative to the stanchion from a first into a second position and conversely. In this case, an overlap between stanchion and sliding tube in the first position is greater than in the second position. The locking device can be transferred from a locking position into a releasing position and conversely, wherein in the locking position the sliding tube is fixed with respect to the stanchion. The energy transmission device is arranged to transmit energy from an external actuating element to be provided to the locking device for releasing and/or locking. At least when the sliding tube is located in the second position, the energy transmission device is guided from an external actuating element to be provided through the second opening of the stanchion as far as the locking device.

The locking device can, for example, be configured as a braking or blocking device. A braking action by the braking device can be achieved, for example, by increasing the coefficient of friction between sliding tube and stanchion. A blocking by a blocking device can be brought about, for example, by catches being able to engage with corresponding recesses on the sliding tube or the stanchion. The adjustable-length seat post thus consists of a tube set comprising at least two telescopable tubes which slide into one another, wherein the two tubes can be blocked with respect to one another by means of the locking device. A receptacle for a bicycle saddle is located at one end of the tube set, i.e. on the sliding tube. The energy transmission device is fed to the locking device through a tube opening of the tube set opposite the receptacle. Consequently, when the sliding tube is located in the first position, i.e. the tube set has its minimal length, any loop formation of the energy transmission device which impedes the rider in his freedom of movement or at least irritates him is avoided.

In a further embodiment of the invention, the sliding tube and the stanchion are formed in a twist-proof manner with respect to one another.

Consequently, the saddle does not twist when the seat post at the first position is transferred into the second position and conversely. This can be accomplished, for example, by a pin formed in the sliding tube which runs in a corresponding groove formed in the stanchion. Consequently, the sliding tube can have a smooth easy-to-clean circumferential surface when the sliding tube is located in the second, extended position. Naturally, the twist resistance can also be produced by suitably selecting the geometrical external contour of the sliding tube. For example, a star contour or an elliptical contour is feasible. Naturally, the opening in the stanchion must be suitably adapted. When pedaling uphill, the seat post in the second extended position is comparable with a fixedly installed seat post. When going downhill, that is when the seat post is located in the first retracted position, the rider can clamp the saddle nose between his thighs without the saddle nose being able to move away. This results in better control of the bicycle. At this point, it should also be mentioned that it can also be possible to shift the seat post into intermediate positions located between the first and the second position and lock it there by means of the locking device.

In a further embodiment of the invention, the locking device is disposed on the sliding tube.

Of course, the locking device could also be integrated in the stanchion. However, it has been found that it is constructively easier to achieve and in addition lighter in weight if the locking device is integrated in the sliding tube. In addition, the circumferential surface of the cylindrically shaped stanchion can be designed to be smooth so that there are no projections protruding beyond the circumferential surface. Since the stanchion additionally has a constant circular cross-section over its entire length, it can be clamped in a corresponding seat tube of a bicycle frame over its entire length. Consequently, when the sliding tube is located in the second position, the stanchion of the adjustable-length seat post can be connected to the bicycle frame in such a position that the distance between the crank and the saddle, more accurately, the distance between bottom bracket and seat surface of the saddle, is optimal for the rider. This setting once selected no longer needs to be changed by the rider during operation of the bicycle.

In a further embodiment of the invention, the locking device is lockable and/or releasable by an electric, pneumatic, hydraulic and/or mechanical energy transmission device.

The electric locking or releasing of the locking device can be accomplished, for example, by a servo motor connected to the locking device. In this case, the electrical energy transmission device is a cable which transmits the electrical energy, for example, in the form of batteries to the servo motor. A pneumatic or hydraulic energy transmission device can comprise a hose or a tube through which the corresponding medium such as, for example, a gas or a fluid flows for actuating the locking device. A mechanical energy transmission device is to be understood, for example as a Bowden cable, as has already been mentioned initially.

In a further embodiment of the invention, the energy transmission device is formed at least partially as spiral-shaped.

One end of the spiral-shaped formation of the energy transmission device can be attached to the locking device and the other end to a fixed part such as, for example, a component of a bicycle frame. When the sliding tube with the locking device is shifted from the first position into the second position or conversely, this change in length can be absorbed by the spiral lengthening or shortening.

In a further embodiment of the invention, the energy transmission device is formed as at least one bend, wherein the bend has an opening which either points towards the stanchion or away from the stanchion.

Consequently, the energy transmission device forms at least one loop. In this case, one end of the loop is connected to the locking device and another end located opposite the one end is firmly connected to a fixed part such as, for example, a component of a bicycle frame. If the sliding tube is now transferred from its first position into its second position or conversely, this merely changes the length of the loop without exerting any forces on the fastening on the fixed part or on the locking device.

Of course, it is also possible to configure the bends of the energy transmission device in such a manner that these are opened transversely to the longitudinal extension of the stanchion. Such a configuration of the energy transmission device is similar in its mode of operation to the spiral-shaped configuration described further above.

In a further embodiment of the invention, the energy transmission device is formed by a rotary bar with an entrainer, wherein either the locking device and/or the entrainer is disposed displaceably along the rotary bar.

The rotary bar can, for example, be formed by a round rod which is constantly flattened over its entire length. The entrainer, for example, in the form of a disk, has an opening in its centre which is formed in such a manner that the rotary bar can be inserted through this centre. For example, the entrainer is displaceable along the rotary bar. The entrainer can also be firmly connected to the rotary bar and the locking device can be displaceable along the rotary bar. Turning or rotation of the entrainer by the energy transmission device also leads to a turning or rotation of the rotary bar. The rotary bar thus engages with the locking device in such a manner that the turning of the rotary bar leads to a release or a locking of the locking device.

In a further embodiment of the invention, the adjustable-length seat post comprises an actuating element. The actuating element is connected to the energy transmission device and is arranged to effect a release and/or locking of the locking element by an actuation of the actuating element.

This actuating element can, for example, be configured as a rotary button, a push button, deflecting lever or pivoting lever. The locking device can be released and/or locked by this actuating lever which is fixedly installed.

In a further embodiment of the invention, the adjustable-length seat post further comprises an energy supply device. In this case, a first end of the energy supply device is connected to the actuating element and a second end of the energy supply device opposite the first end is connected to the energy transmission device.

The energy supply device can, for example, be laid firmly on the bicycle frame. This makes it possible to fasten the actuating element as desired, naturally in particular on the handlebars in the vicinity of the handlebar grip. Consequently, it is possible for the rider to actuate the adjustable seat post without needing to take his hand from the handlebar. The energy supply device can be connected either fixedly or detachably to the energy transmission device. The detachable connecting element can be a plug-coupling combination, wherein the plug, for example, is fastened on the energy supply device and the coupling is fastened the energy transmission device. The energy supply device can, for example, be a cable for transferring electrical energy or a hose or tube for transferring a gaseous or liquid medium. For transmitting mechanical energy, the energy supply device can also be configured as a Bowden cable, which for example acts on the outer side of the entrainer.

In a further embodiment of the invention, a bicycle frame is provided with an adjustable-length seat post, wherein the bicycle frame further comprises a seat tube having an opening located at one end. In this case, the stanchion is guided through the opening into the seat tube and the stanchion is fastened in the seat tube in a pre-selected position. Furthermore, the energy transmission device runs inside the seat tube.

Consequently, an embodiment is possible in which the energy supply device runs between the actuating element mounted on the handlebars and the seat tube along the frame. The energy supply device is connected to the frame. Shifting the sliding tube from the first position into the second position and conversely does not result in any change in length of the energy supply device and therefore no loop formation. Merely the energy transmission device configured, for example, in spiral form, which runs inside the seat tube, is extended or compressed relative to the stanchion according to the change in length of the sliding tube. Consequently, a change in length of the seat post does not result in any change in length of the energy supply device.

In a further embodiment of the invention, the energy supply device is guided into the seat tube or the energy transmission device is guided out from the seat tube.

Usually, particularly when using an electrical, pneumatic or hydraulic energy transmission, the energy supply device runs as far as the seat tube and is connected at this point to the energy transmission device. In this case, the energy supply device and the energy transmission device can also be configured in one piece. It is also possible to connect the energy supply device detachably to the energy transmission device, for example, by a plug-coupling combination. In this case, the seat tube can be used as a holder for the plug/coupling connected to the energy transmission device. These designs which have been described apply both when the energy supply device-energy transmission device unit is guided through the wall of the seat tube and also when the energy supply device-energy transmission device unit is guided through the opening of the seat tube located opposite the seat post. Specifically when using the rotary bar with the entrainer as an energy transmission device, it can be appropriate to guide the entrainer as part of the energy transmission device at least partially out from the seat tube. This facilitates the fastening of the energy supply device, for example, in the form of a Bowden cable, to the entrainer.

In a further embodiment of the invention, the bicycle frame comprises a down tube. This energy supply device is laid at least partially along the down tube.

When using so-called diamond frames, the connection between energy supply device and energy transmission device will usually lie in the wall of the seat tube in the vicinity of the bottom bracket. It can therefore be appropriate to lay the energy supply device along the down tube since this can be the shortest connection between actuating element and energy transmission device. Naturally it is also possible to guide the energy supply device through the bottom bracket receptacle to the seat tube opening.

In a further embodiment of the invention, the energy supply device is laid at least partially in the down tube of the bicycle frame.

Laying the energy supply device in the down tube protects the energy supply device from external influences. Consequently, stones thrown up by a front wheel of the bicycle cannot damage the energy supply device. Laying the energy supply device in the down tube also presents an aesthetic appearance. Specifically in the case of the diamond frame, the energy supply device inside the down tube can be directly connected to the energy transmission device running on the seat tube around the bottom bracket. Consequently, an energy supply device entering into the down tube in the vicinity of the steering head bearing will run with the energy transmission device as far as the locking device completely inside the bicycle frame.

In a further embodiment of the invention, the bicycle frame further comprises a top tube, wherein the top tube is connected to the seat tube. In this case, the energy supply device is laid at least partially inside the top tube.

When using so-called Y-bicycle frames, it can prove inexpedient to feed the energy supply device in or on the down tube of the energy transmission device. Consequently, laying the energy supply device inside or along the top tube can prove the best connection between the actuating element and the energy transmission device. Here also, laying the energy supply device inside the top tube protects against external influences.

According to a further aspect of the invention, a bicycle, in particular a mountain bike, is fitted with a bicycle frame, the bicycle further comprising a handlebar. In this case, the actuating element is detachably connected to the handlebar.

As has already been presented in the foregoing, the actuating element can, for example, comprise an actuating lever or an actuating button. From the ergonomic viewpoint, the attachment situation of an actuating button or an actuating lever with respect to the actuating hand of the rider is different. Since the actuating element is detachably connected to the handlebar, the actuating element can be individually adjusted to the rider so that the actuating element can be optimally actuated by the rider.

It should be understood that the afore-mentioned features can also be combined. As a result, effects which go beyond the individual effects of the individual features can be obtained.

DETAILED DESCRIPTION OF EXEMPLARY EMBODIMENTS

Figure 1:
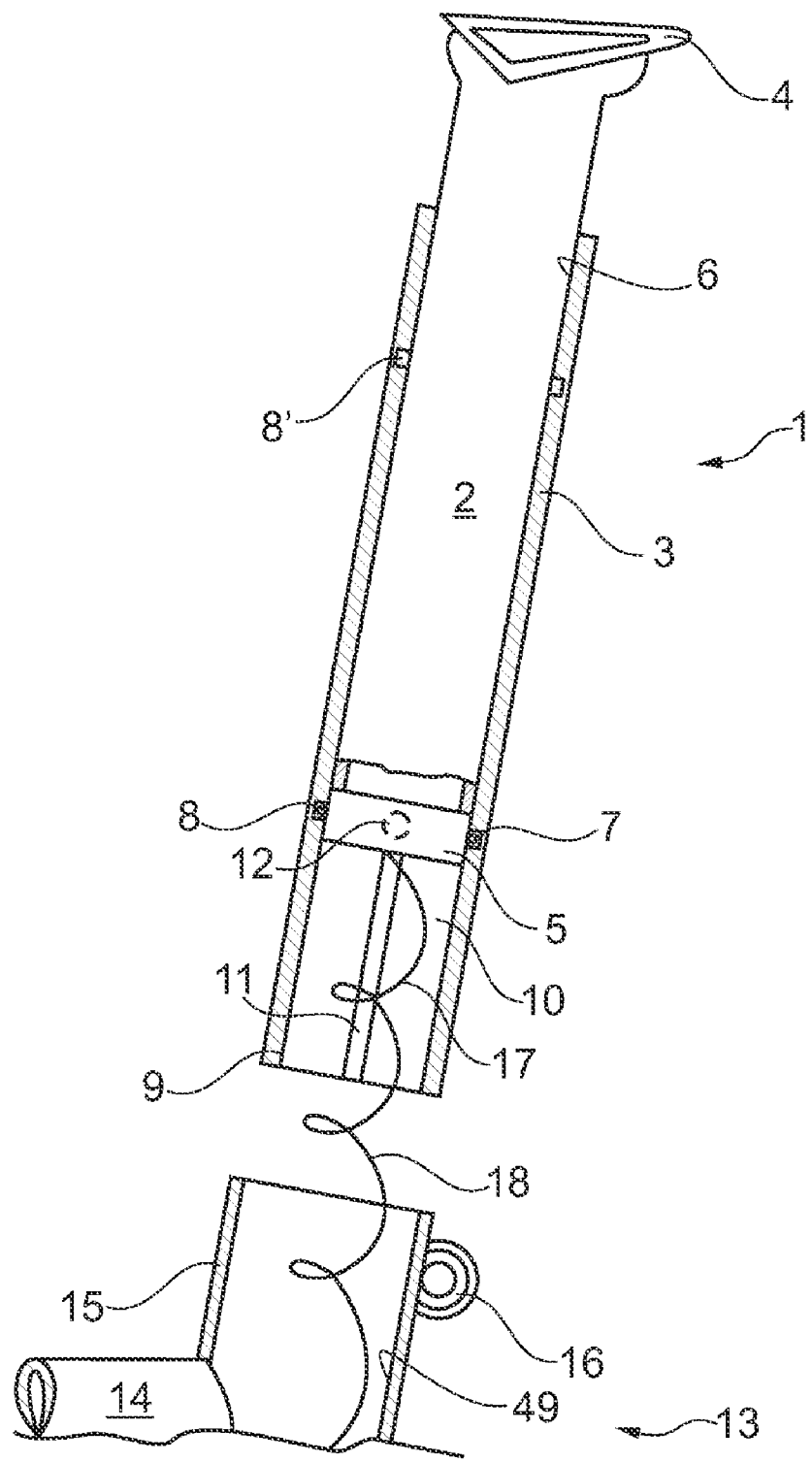
FIG. 1 shows an adjustable-length seat post in a first position.

The same or similar components in different figures are provided with the same reference numerals. The diagrams in the figures are schematic and not to scale.

FIG. 1 shows an adjustable seat post 1 according to one exemplary embodiment of the invention comprising a sliding tube 2 and a stanchion 3 in a first position. At one end the sliding tube 2 has a receptacle 4 for a bicycle saddle. At an end of the sliding tube 2 opposite the receptacle 4, a locking device 5 is firmly connected to the sliding tube 2. The stanchion 3 has a first opening 6 through which the sliding tube 2 is guided into the stanchion 3. The locking device 5 is formed as a blocking device. To this end, the locking device 5 has latches 7 which engage with recesses 8 or 8'. The recesses 8 are located near a second opening 9 opposite the first opening 6 in an inner wall 10 of the stanchion 3. The recesses 8' are disposed near the first opening 6 on the inner wall 10 of the stanchion 3. In the present embodiment, the distance of the recesses 8 and 8' is about 200 mm. This is also the adjustment track of the sliding tube 2 relative to the stanchion 3 along which the sliding tube 2 is shifted from the first, pushed-together position to reach a second, pulled-apart position along a longitudinal direction of extension of the stanchion 3. The adjustment range, i.e. the distance of the recesses 8 from the recesses 8' can also be selected to be larger or smaller. In order to configure the sliding tube 2 as twist-proof with respect to the stanchion 3, the stanchion 3 has a groove 11 in the inner wall 10 which extends in the direction of longitudinal extension of the stanchion 3. A pin 12 which is fixedly connected to the locking device 5 engages with this groove.

Shown in the diagram below the adjustable seat post 1 is a partial region of a bicycle frame 13 comprising a top tube 14, a seat tube 15 fastened thereon and a seat clamp 16 fastened on the seat tube 15. The stanchion 3 is guided into an opening 49 located at one end of the seat tube 15. The stanchion 3 is then pushed by the rider by a predetermined length into the seat tube 15 and is detachably fixed at this position by the seat clamp 16. In order to release and/or lock the latches 7 of the locking device 5, an energy transmission device 17 is firmly connected to the locking device 5. In the present embodiment, the energy transmission device 17 is provided for transmitting hydraulic energy. Accordingly, the energy transmission device 17 comprises of a hose 18 (see FIG. 3) which is wound in a spiral shape and through which hydraulic fluid flows. The hose runs from the locking device 5 into the seat tube 15.

In the first, pushed-together position, the length between the receptacle 4 of the sliding tube 2 and the second opening 9 of the stanchion 3 is minimal.

Figure 2:
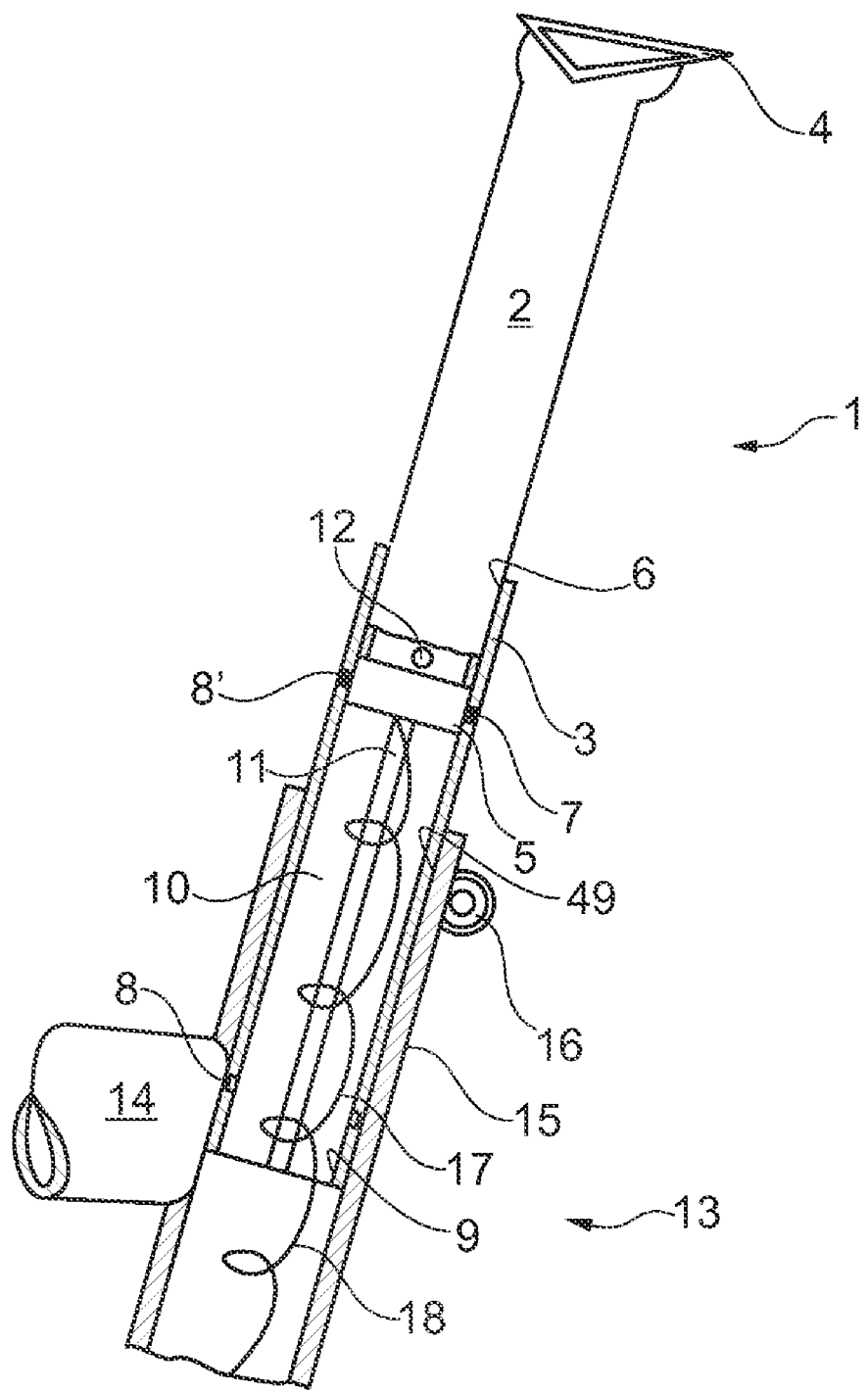
FIG. 2 shows an adjustable-length seat post in a second position.

FIG. 2 shows the adjustable seat post 1 located in a second position according to a further exemplary embodiment of the invention, built into the bicycle frame 13. To this end, the stanchion 3 is inserted by a predetermined length through the opening 49 into the seat tube 15 and is detachably fixed with the seat clamp 16. It is clearly visible how the spiral-shaped hose 18 is guided into the seat tube 15 from the locking device 5. In the second position the length between the receptacle 4 of the sliding tube 2 and the second opening 9 of the stanchion 3 is maximal.

In order to transfer the sliding tube 2 from the first position (FIG. 1) into the second position (FIG. 2), the latches 7 of the locking device 5 are released by the energy transmission device 17. The sliding tube 2 now shifts independently into the second position by means of a spring, not shown here. On reaching the second position, the latches 7 engage with the recesses 8'. During this shifting process, the spiral-shaped hose 18 is lengthened. A shift of the sliding tube 2 from the second position into the first position is accomplished in a corresponding manner and leads to a compression of the spiral-shaped hose 18.

Figure 3:
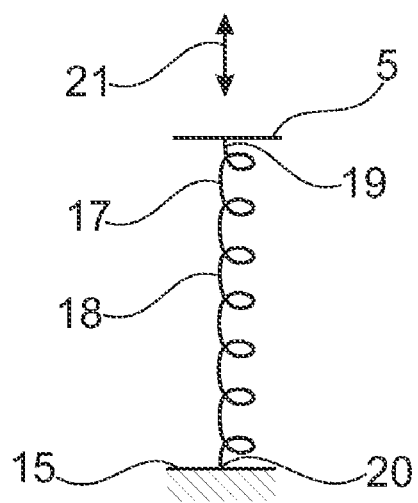
FIG. 3 shows a first exemplary embodiment of an energy transmission device.

FIG. 3 shows a first exemplary embodiment of the energy transmission device 17, wherein the energy transmission device 17 is configured as a spiral-shaped hose 18. A first end 19 of the hose 18 is firmly connected to the locking device 5 and a second end 20 which is located opposite to the first end 19 is firmly connected to the seat tube 15. If the sliding tube 2 with the locking device 5 is now shifted along the double arrow 21, this results in an expansion or a compression of the spiral-shaped hose 18 or the spiral respectively.

Figure 4:
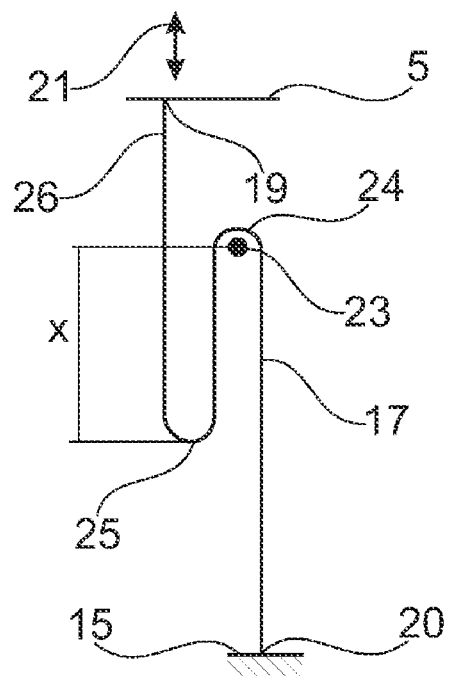
FIG. 4 shows a second exemplary embodiment of an energy transmission device.

FIG. 4 shows a second embodiment of the energy transmission device 17, wherein the energy transmission device 17 is configured here as a limp cable 22. The cable 22 also has a first end 19 and a second end 20. The first end 19 is connected to a servo motor which is flange-mounted to the locking device 5, not shown here. The second end 20 is firmly connected to the seat tube 15. The cable 22 is considerably longer than the distance between the locking device 5 and the fastening on the seat tube 15. The cable 22 is guided over a mandrel 23, which is firmly connected to the seat tube 15, and fastened to the mandrel. The cable 22 thereby forms a first bend 24 which is open towards the second end 20 of the cable 22. The cable 22 furthermore forms a second bend 25 which is open towards the sliding tube 2. If the sliding tube 2 is now shifted along the double arrow 21 in the stanchion 3, a distance X between the second bend 25 and the mandrel 23 changes. Of course, the cable 22 can also be guided in a protective hose or on a cable carrier system which functions similarly to a chain and in which the cable 22 is laid in the chain. As a result, the cable 22 is additionally protected from damage which could possibly be caused by the stanchion 3 or the seat tube 15 during shifting of the sliding tube 2.

Figure 5:
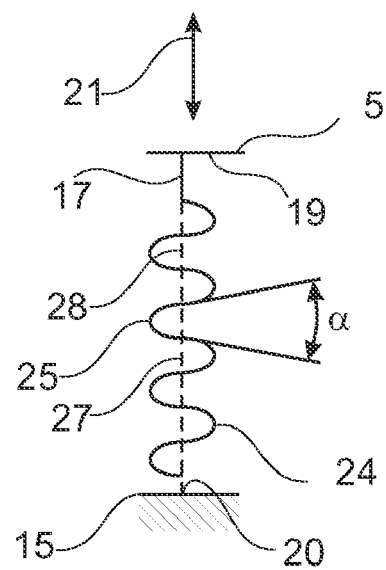
FIG. 5 shows a third exemplary embodiment of an energy transmission device.

FIG. 5 shows a third exemplary embodiment of the energy transmission device 17. In this case, the energy transmission device 17 is configured as a hose 26. In this exemplary embodiment the hose 26 is configured to transmit air as energy for actuating the locking device 5. Also this hose 26 has a first end 19 and a second end 20 opposite the first end 19. The first end 19 is firmly connected to the locking device 5, whilst the second end 20 is firmly connected to the seat tube 15. The hose 26 is limp. The length of the hose 26 is greater than the distance of the locking device 5 from the fastening of the hose 26 on the seat tube 15. The hose 26 is laid in such a manner that the hose 26 extends in an S-shape along the longitudinal direction of extension of the sliding tube 2. In order that the hose 26 remains in the S-shaped form, each bend 24, 25 formed transversely to the longitudinal direction of extension of the sliding tube 2 is stabilised by a tension spring 27. Instead of the individual tension springs 27, a continuous rubber band 28 can also be used, the hose 26 then being fixed on the rubber thread 28 in such a manner that individual bends 24, 25 are formed. If the sliding tube 2 is shifted along the double arrow 21, this results in an expansion or compression of the rubber thread 28 or of the springs 27 and therefore in a variation of the opening angle α of the bends 24, 25.

Figure 6:
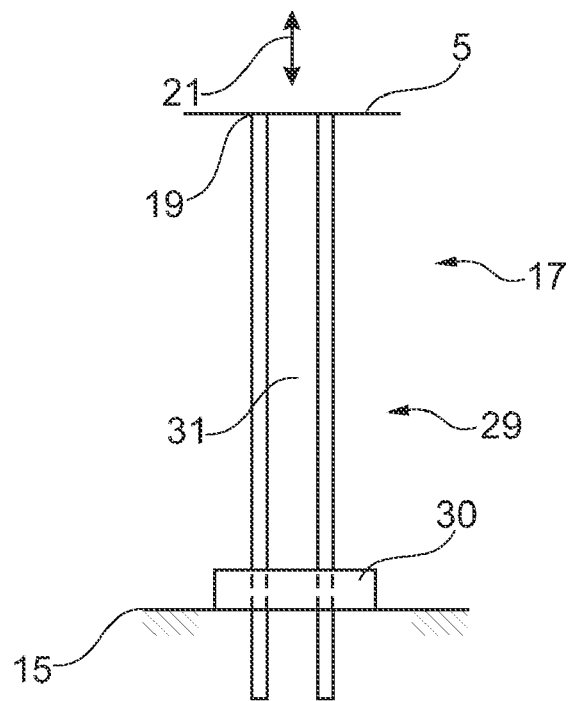
FIG. 6 shows a fourth exemplary embodiment of an energy transmission device.

FIG. 6 shows a fourth embodiment of the energy transmission device 17. The energy transmission device 17 consists of a rotary bar 29 which is connected by its one end 19 to the locking device 5 and extends in the longitudinal direction of extension of the sliding tube 2, and an entrainer 30. The rotary bar 29 consists of a round rod which has a continuous flattening 31. This is clearly visible in FIG. 7 which shows a cross-section through the rotary bar 29 and a plan view of the entrainer 30. The cross-section through the rotary bar 29 is shown hatched.

The entrainer 30 is fastened in the seat tube 15 in such a manner that it can turn but is invariant in height relative to the seat tube 15. The rotary bar 29 is displaceable along its longitudinal direction of extension relative to the entrainer 30.

Figure 7:
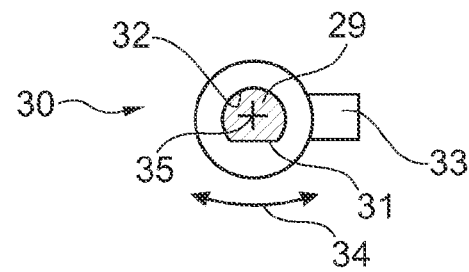
FIG. 7 shows a plan view of an entrainer and a cross-section of a rotary bar.

It can also be clearly seen in FIG. 7 that an internal opening 32 of this entrainer 30 has the external contour of the rotary bar 29. In addition, the entrainer 30 has a side arm 33 which is firmly connected to the entrainer 30. A deflection of the side arm 33 along the double arrow 34 leads to a rotary movement of the entrainer 30 about an axis of rotation 35. The rotary bar 29 is turned or rotated through a turning or rotating of the entrainer 30. Due to this turning the latches 7 of the locking device 5 are disengaged or engaged. As a result of an unlocking of the latches 7, the sliding tube 2 is displaceable along the double arrow 21 relative to the entrainer 29.

Figure 8:
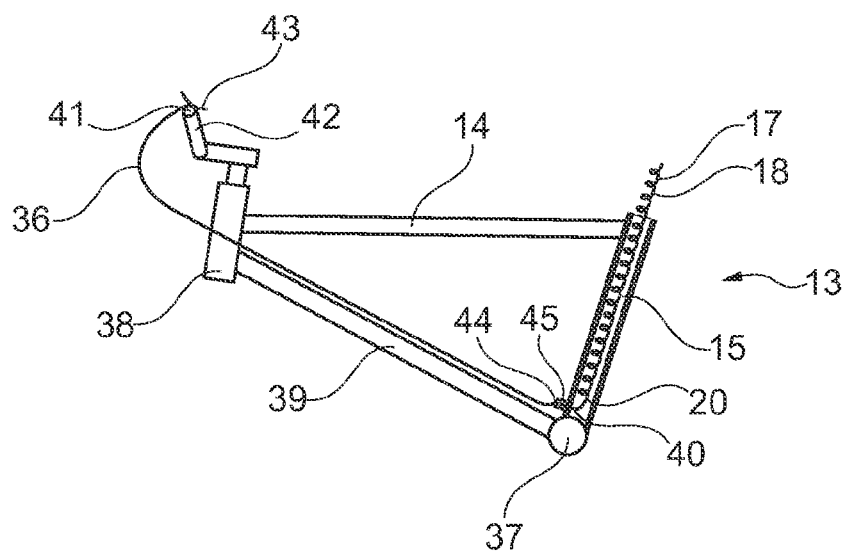
FIG. 8 shows a first exemplary embodiment of a laying of an energy supply device.

The side arm 33 of the entrainer 30 can be deflected by an energy supply device 36 as shown in FIG. 8 in one embodiment of a Bowden cable.

Figure 9:
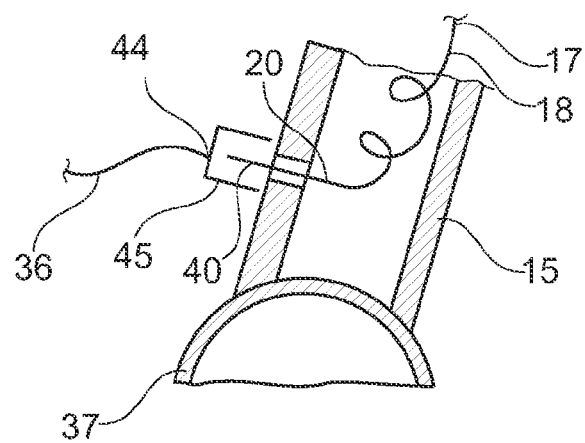
FIG. 9 shows a section from a seat tube with a plug-coupling combination.

FIG. 8 shows a first exemplary embodiment of a laying of the energy supply device 36. In addition to the top tube 14 already known from FIG. 1 and seat tube 15, the bicycle frame 13 shown here also comprises a bottom bracket receptacle 37, a steering head 38 and a down tube 39. For reasons of clarity the adjustable seat post 1 is omitted in this diagram but the energy transmission device 17 running inside the seat tube 15 is shown as a spiral-shaped hose 18. The second end 20 of the hose 18 ends in a plug 40 (see FIG. 9) which is firmly connected to the seat tube 15 above the bottom bracket receptacle 37 and can be operated from outside. The energy supply device 36 in the form of a hose has a first end 41 which is connected to an actuating element 43 fastened to a handlebar 42. The actuating element 43 is configured here as a rocker switch. An end 44 opposite the first end 41 of the energy supply device 36 is firmly connected to a coupling 45. This coupling 45 can be detachably connected to the plug 40. In the present exemplary embodiment, the energy supply device 36 is laid along the down tube 39. Although the adjustable-length seat post 1 is not shown here, it can be identified that during a length adjustment of the seat post 1 merely the spiral 18 running in the seat tube 15 is lengthened or shortened. A loop formation of the energy supply device 36 does not take place due to this length adjustment.

Figure 10:
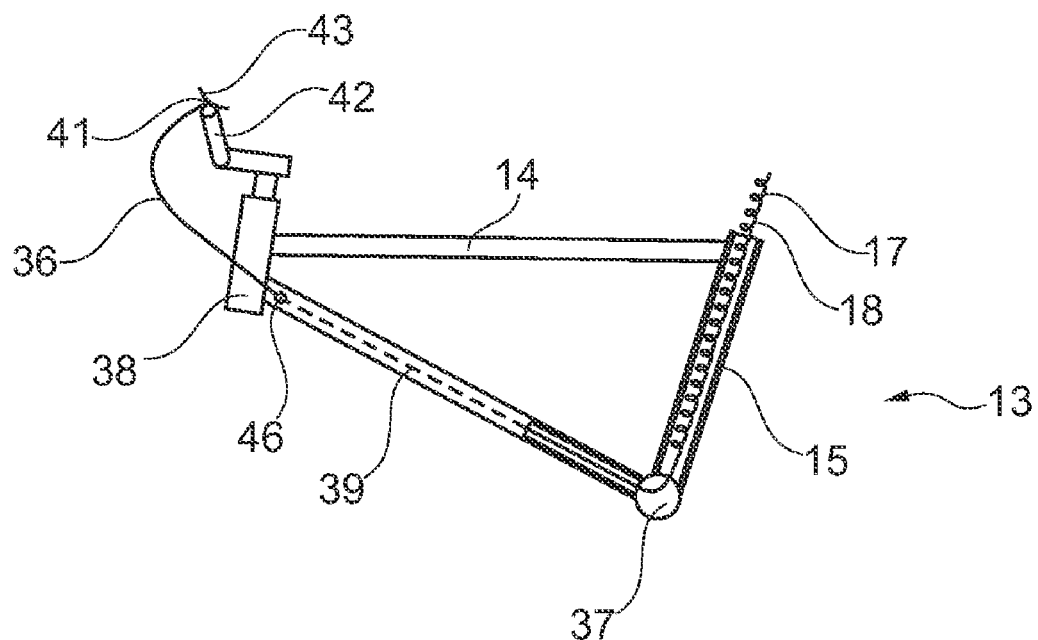
FIG. 10 shows a second exemplary embodiment of a laying of an energy supply device.

FIG. 10 shows a second possibility for laying the energy supply device 36. For this purpose, an opening 46 is located in the down tube 39 near the steering head 38, through which the energy supply device 36 is guided into the down tube 39. The energy supply device 36 is guided through the bottom bracket receptacle 37 and connected to the energy transmission device 17. In the present exemplary embodiment the energy supply device 36 is firmly connected to the energy transmission device 17 and executed in one piece. Consequently, in contrast to the design in FIGS. 8, 9, no plug-coupling combination 40, 45 exists in FIG. 10. Here also, in contrast to the laying shown in FIG. 8, the energy supply device 36 is laid almost completely inside the frame 13 which is configured as a diamond frame. The energy supply device 36 is therefore protected from damage which can be caused by stones, for example, which can be thrown upwards by a front wheel not shown here.

Figure 11:
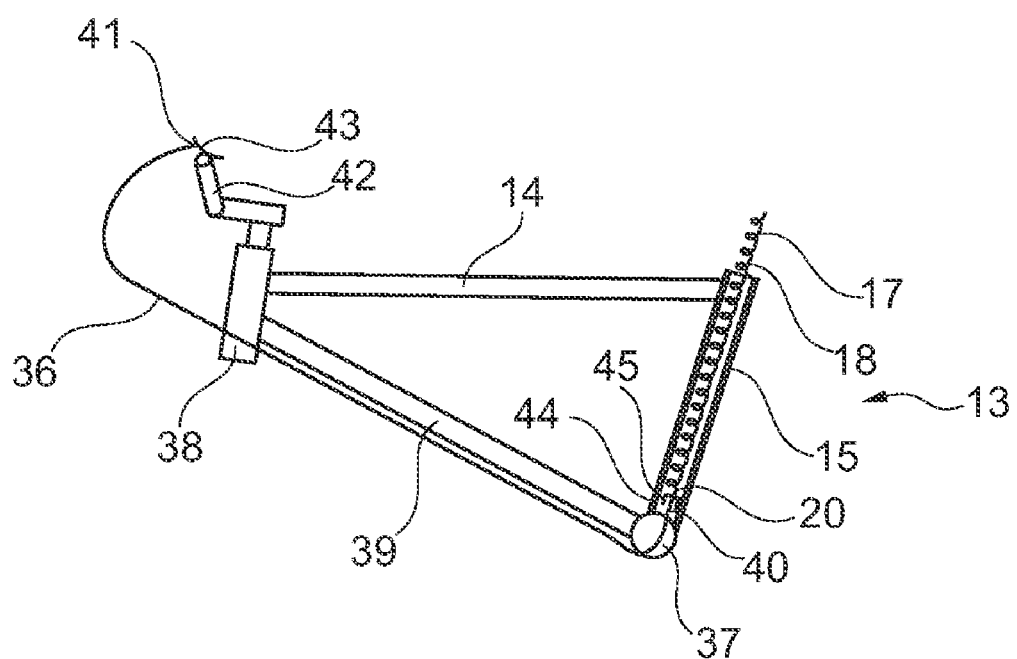
FIG. 11 shows a third exemplary embodiment of a laying of an energy supply device.

FIG. 11 shows a third exemplary embodiment of a laying of the energy supply device 36. In contrast to FIG. 8, here the energy supply device 36 is guided along the down tube 39 as far as the bottom bracket receptacle 37 and through the bottom bracket receptacle 37 into the seat tube 15 as far as the energy transmission device 17. In the present exemplary embodiment, the energy supply device 36 is connected to the energy transmission device 17 by means of a plug-coupling combination 40, 45 disposed in the seat tube 15, the plug 40 being fixed on the seat tube 15. Of course, the energy transmission device 17 could also project into the bottom bracket receptacle 37 and the plug-coupling combination 40, 45 could be fastened on the bottom bracket receptacle 37.

Figure 12:
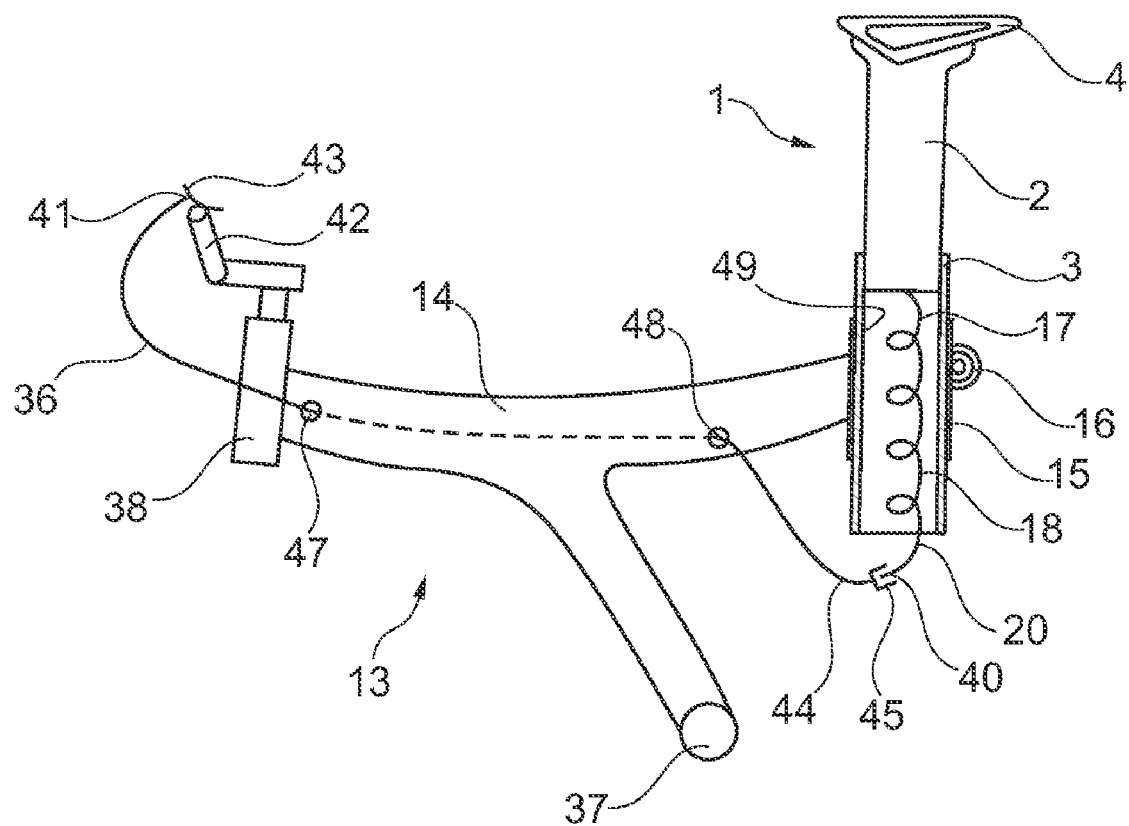
FIG. 12 shows a fourth exemplary embodiment of a laying of an energy supply device.

FIG. 12 shows an embodiment for laying an energy supply device 36 on the bicycle frame 13 configured in a so-called Y-shape. The seat tube 15 connected to the top tube 14 resembles a tube stub so that the stanchion 3 guided through the opening 49 into the seat tube 15 emerges from the seat tube 15 in the direction of the bottom bracket receptacle 37.

The energy transmission device 17 configured as a spiral 18 projects from the stanchion 3, at least when the adjustable-length seat post 1 is located in the first pushed-together position. The top tube 14 has a first opening 47 near the steering head 38 and a second opening 48 near the seat tube 15. The energy supply device 36 is guided through the first opening 47 into the top tube 14 and through the second opening 48 out from the top tube 14 again. The second end 44 of the energy supply device 36 is firmly connected to the coupling 45. The coupling 45 is detachably connected to the plug 40 of the energy transmission device 17. In the present FIG. 11 it can be clearly seen that a shift of the sliding tube 2 of the adjustable seat post 1 here also does not result in any loop formation of the energy supply device 36 or of the energy transmission device 17 which impedes or at least perturbs the rider.

In addition, it is pointed out that "comprising" does not exclude any other elements or steps and "one" or "a" does not exclude a plurality. It should also be noted that features or steps which have been described with reference to one of the above exemplary embodiments can also be used in combination with other features or steps of other exemplary embodiments described above. Reference numerals in the claims should not be regarded as a restriction.

What is claimed is:

1. An adjustable-length seat post for a bicycle, wherein the adjustable-length seat post comprises:
   a stanchion, configured to attach to a bicycle seat, having a first opening and a second opening opposite the first opening;
   a sliding tube;
   a locking device; and
   an energy transmission device;
   wherein the sliding tube is guided through the first opening into the stanchion;
   wherein the sliding tube is displaceable along a longitudinal direction of extension of the stanchion;
   wherein the sliding tube is movable relative to the stanchion from a first into a second position and conversely;
   wherein an overlap between stanchion and sliding tube in the first position is greater than in the second position;
   wherein the locking device can be transferred from a locking position into a releasing position and conversely;
   wherein in the locking position the sliding tube is fixed with respect to the stanchion;
   wherein the energy transmission device is set up to transmit energy from an external actuating element to be provided to the locking device for releasing and/or locking; and
   wherein, at least when the sliding tube is located in the second position, the energy transmission device is guided from an external actuating element to be supplied through the second opening of the stanchion as far as the locking device.

2. The adjustable-length seat post according to claim 1, wherein the sliding tube and the stanchion are formed in a twist-proof manner with respect to one another.

3. The adjustable-length seat post according to claim 1, wherein the locking device is disposed on the sliding tube.

4. The adjustable-length seat post according to claim 1, wherein the locking device is lockable and/or releasable by an electric, pneumatic, hydraulic and/or mechanical energy transmission device.

5. The adjustable-length seat post according to claim 1, wherein the energy transmission device is formed at least partially as spiral-shaped.

6. The adjustable-length seat post according to claim 1, wherein the energy transmission device is formed as at least one bend;
 wherein the bend has an opening which either points towards the stanchion or away from the stanchion.

7. The adjustable-length seat post according to claim 1, wherein the energy transmission device is formed by a rotary bar with an entrainer, and
 wherein either the locking device and/or the entrainer is disposed displaceably along the rotary bar.

8. The adjustable-length seat post according to claim 1, further comprising an actuating element;
 wherein the actuating element is connected to the energy transmission device;
  wherein the actuating element is set up to effect a release and/or locking of the locking element by an actuation of the actuating element.

9. The adjustable-length seat post according to claim 1, further comprising an energy supply device;
 wherein a first end of the energy supply device is connected to the actuating element and a second end of the energy supply device opposite the first end is connected to the energy transmission device.

10. The adjustable-length seat post according to claim 1, further comprising:
 a bicycle frame having a seat tube having an opening located at one end, wherein the stanchion is guided through the opening into the seat tube;
 wherein the stanchion is detachably fastened in the seat tube in a pre-selected position; and
 wherein the energy transmission device runs inside the seat tube.

11. The adjustable-length seat post according to claim 10, wherein the energy supply device is guided into the seat tube and the energy transmission device is guided out from the seat tube, respectively.

12. The adjustable-length seat post according to claim 10, further comprising a down tube;
 wherein the energy supply device is laid at least partially along the down tube.

13. The adjustable-length seat post according to claim 12, wherein the energy supply device is laid at least partially in the down tube.

14. The adjustable-length seat post according to claim 10, further comprising a top tube;
 wherein the top tube is connected to the seat tube; and
 wherein the energy supply device is laid at least partially inside the top tube.

15. The adjustable-length seat post according to claim 10, wherein the bicycle further comprises a handlebar;
 wherein the actuating element is detachably connected to the handlebar.

16. The adjustable-length seat post according to claim 15, wherein the bicycle is a mountain bike.

* * * * *